United States Patent
Ferrari

(10) Patent No.: US 11,993,165 B2
(45) Date of Patent: May 28, 2024

(54) CHARGING SYSTEM AND METHOD OF A BATTERY OF AN ELECTRIC VEHICLE BASED ON CABLE AUTHENTICATION

(71) Applicant: BIKEF S.R.L., Monticelli Brusati (IT)

(72) Inventor: Massimo Ferrari, Monticelli Brusati (IT)

(73) Assignee: BIKEF S.R.L., Monticelli Brusati (IT)

( * ) Notice: Subject to any disclaimer, the term of this patent is extended or adjusted under 35 U.S.C. 154(b) by 489 days.

(21) Appl. No.: 17/169,811

(22) Filed: Feb. 8, 2021

(65) Prior Publication Data
US 2021/0245619 A1 Aug. 12, 2021

(30) Foreign Application Priority Data
Feb. 7, 2020 (IT) .................. 102020000002455

(51) Int. Cl.
*B60L 53/18* (2019.01)
*B60L 53/16* (2019.01)
(Continued)

(52) U.S. Cl.
CPC .............. *B60L 53/18* (2019.02); *B60L 53/16* (2019.02); *B60L 53/305* (2019.02); *B60L 53/65* (2019.02);
(Continued)

(58) Field of Classification Search
CPC ........ B60L 53/18; B60L 53/16; B60L 53/305; B60L 53/65; B60L 53/66; B60L 53/665;
(Continued)

(56) References Cited

U.S. PATENT DOCUMENTS 11,001,160 B2 * 5/2021 Stadler ................. B60L 53/65
2003/0060243 A1 * 3/2003 Burrus, IV ......... H02J 7/00038
455/572
(Continued)

FOREIGN PATENT DOCUMENTS

EP 0769217 B1 * 10/2001
EP 2292460 A2 3/2011
(Continued)

OTHER PUBLICATIONS

Search Report for IT2020000002455 dated Oct. 20, 2020, The Hague, NL.

*Primary Examiner* — Richard Isla
*Assistant Examiner* — Manuel Hernandez
(74) *Attorney, Agent, or Firm* — ArentFox Schiff LLP; Michael Fainberg

(57) ABSTRACT

A charging system of an electric vehicle battery is provided. The charging system has a charging station and at least one charging cable connectable to a battery to be charged. The charging station has at least one power unit provided with a power card adapted to charge the battery and a female-type connector adapted to connect to a male-type connector of the at least one charging cable. The at least one charging cable and the charging station have respective authentication circuits configured to implement a cable authentication algorithm which, in case of positive outcome, enables charging the battery. The charging system allows charging batteries of different types and working voltages. A method for charging an electric vehicle battery is also provided.

10 Claims, 6 Drawing Sheets

(51) Int. Cl.

| | | |
|---|---|---|
| *B60L 53/30* | (2019.01) | |
| *B60L 53/65* | (2019.01) | |
| *B60L 53/66* | (2019.01) | |
| *G06F 21/30* | (2013.01) | |
| *G06F 21/31* | (2013.01) | |
| *G06F 21/33* | (2013.01) | |
| *G06F 21/34* | (2013.01) | |
| *G06F 21/44* | (2013.01) | |
| *H02J 7/00* | (2006.01) | |
| *G06F 21/45* | (2013.01) | |

(52) U.S. Cl.
CPC ............ *B60L 53/66* (2019.02); *B60L 53/665* (2019.02); *G06F 21/30* (2013.01); *G06F 21/31* (2013.01); *G06F 21/33* (2013.01); *G06F 21/34* (2013.01); *G06F 21/44* (2013.01); *H02J 7/00032* (2020.01); *H02J 7/00036* (2020.01); *H02J 7/00038* (2020.01); *H02J 7/00041* (2020.01); *H02J 7/00045* (2020.01); *H02J 7/00047* (2020.01); *B60L 2200/12* (2013.01); *G06F 21/45* (2013.01)

(58) Field of Classification Search
CPC ...... B60L 2200/12; G06F 21/30; G06F 21/31; G06F 21/33; G06F 21/34; G06F 21/44; G06F 21/45; H02J 7/00032; H02J 7/00036; H02J 7/00038; H02J 7/00041; H02J 7/00045; H02J 7/00047
USPC ....................................................... 320/109
See application file for complete search history.

(56) References Cited

U.S. PATENT DOCUMENTS

| | | | |
|---|---|---|---|
| 2003/0218550 A1* | 11/2003 | Herrmann | H04B 3/56 323/241 |
| 2009/0061678 A1* | 3/2009 | Minoo | G06F 21/44 439/502 |
| 2009/0278492 A1* | 11/2009 | Shimizu | H02J 7/0048 320/108 |
| 2011/0145141 A1* | 6/2011 | Blain | B60L 53/65 235/382 |
| 2012/0135634 A1 | 5/2012 | Gaul et al. | |
| 2015/0346792 A1* | 12/2015 | Rathi | G06F 1/26 713/310 |
| 2016/0185244 A1 | 6/2016 | Baxter et al. | |
| 2018/0001776 A1* | 1/2018 | Kim | B60L 53/14 |
| 2018/0121683 A1* | 5/2018 | Goldberg | G06F 21/88 |
| 2019/0322190 A1* | 10/2019 | Stadler | B60L 53/16 |
| 2020/0231051 A1* | 7/2020 | Krogh | B60L 53/16 |
| 2023/0271516 A1* | 8/2023 | Meyer | B60L 53/12 320/109 |

FOREIGN PATENT DOCUMENTS

| | | | | |
|---|---|---|---|---|
| EP | 2583859 A2 | | 4/2013 | |
| JP | 2013198279 A | * | 9/2013 | |
| KR | 20190006211 A | | 1/2019 | |
| KR | 2019081757 A | * | 7/2019 | ............ B60L 3/0069 |
| WO | 2018/056272 A1 | | 3/2018 | |

\* cited by examiner

CHARGING SYSTEM AND METHOD OF A BATTERY OF AN ELECTRIC VEHICLE BASED ON CABLE AUTHENTICATION

CROSS-REFERENCE TO RELATED APPLICATION

This application claims priority to Italian Patent Application No. 102020000002455 filed on Feb. 7, 2020, the entire contents of which is hereby incorporated in its entirety by reference

FIELD OF THE INVENTION

The present invention relates to a system and method for charging batteries of electric vehicles, in particular of electric bicycles or pedal-assisted vehicles.

BACKGROUND OF THE INVENTION

The increasing diffusion of electric vehicles, in particular of bicycles, is leading to local installation of electric vehicle charging stations.

In order to charge an electric vehicle battery, it is necessary to have a charging cable with an electrical connector that connects to a corresponding electrical connector on the charging station and, at the opposite end, an electrical connector that connects to the electric vehicle battery.

One of the problems of charging systems based on locally installed charging stations is compatibility with different types and brands of batteries.

Batteries may differ from one another for a different supply voltage, typically 36 V or 48 V.

Patent application EP 2583859 A2 aims to solve the problem of different supply voltages by providing charging cables with an electronic identification device, for example, an RFID tag, a barcode or a QR-code, which contains information on supply voltage, and charging stations with an electronic reading device capable of receiving the information contained in the electronic identification device and of communicating to a control unit of a charging station which supply voltage has to be used.

A survey of different batteries on the market has revealed two types of batteries which differ in the charging method: a first, simpler type of battery that can be charged as soon as current is supplied to the terminals of the charging cable, and a second type of battery, that, on the other hand, requires the battery to receive a control signal to connect the battery poles to the charging cable.

The difference in the charging mode is also reflected in a multiplicity of circuits and charging cables.

Another problem of currently used charging systems is that while the charging station is designed to comply with electrical standards and the strictest safety regulations, it is not possible to ensure that the charging cable used by the user is also compatible with such standards and safety regulations.

A non-conforming cable may not only be dangerous but may also damage both the charging station and the battery to be charged.

SUMMARY OF THE INVENTION

It is an object of the present invention to solve, at least in part and in a simple and cost-effective manner, drawbacks of different charging modes.

It is another object of the present invention to provide a charging system and a method ensuring that the charging service is delivered in a safe and efficient manner, respecting integrity of the charging station and of the vehicle battery.

Such objects are achieved by a charging system and by a charging method as described and claimed herein. Preferred embodiments of the present invention are also described.

According to an aspect of the present invention, the charging system of a battery of an electric vehicle, in particular a bicycle, comprises a charging station and at least one charging cable connectable to a battery to be charged. The charging station comprises at least one power unit provided with a power card adapted to charge the battery and with a female-type connector adapted to connect to a male-type connector of the charging cable.

The charging cable and the charging station are provided with respective authentication circuits configured to implement a cable authentication algorithm which, in case of positive outcome, enables charging the battery.

In an embodiment, a unique cable identifier code is stored in the cable authentication circuit. The cable authentication circuit of the charging station is configured to read the unique cable identifier code.

The charging method using the aforesaid charging system provides checking whether the cable is authentic by means of an authentication procedure run by the cable authentication circuits on the cable and on the charging station when the cable is connected to the charging station.

In particular, battery charging is subject to checking whether a user is enabled to use the charging service. Such a check is performed by a user identification procedure which comprises:

associating a unique cable identifier code (ROMID) with each cable, during the cable manufacturing step, the unique cable identifier code being unmodifiable and read by the charging station when the cable is connected to the charging station;

associating the unique cable identifier code with a unique cable identification token (CTID) and a unique user identifier code (UID);

transmitting, by the user, the unique cable identification token (CTID) and the unique user identifier code (UID) to the charging station;

connecting the cable to the charging station;

obtaining the unique cable identification token (CTID) from the charging station by reading the unique cable identifier code (ROMID) stored in the connected cable; and comparing, by the charging station, the obtained unique cable identification token (CTID) with the unique identifier code transmitted by the cable with the unique cable identification token (CTID) transmitted by the user.

If the two tokens coincide, the user is enabled to request the service; therefore, power supply to the battery is activated, or the cable authentication procedure is activated which, if the outcome is positive, enables service delivery.

If the two tokens do not coincide, an alarm signal is generated and delivery is not enabled.

In an embodiment, the unique cable identification token (CTID) and the unique user identifier code (UID) are transmitted in a wireless manner by the user to the charging station via an app residing on a portable electronic device of the user, for example, a smartphone.

Features and advantages of the charging method and system according to the present invention will be apparent from the following description of preferred embodiments, given by way of indicative, non-limiting examples, with reference to the accompanying figures.

DETAILED DESCRIPTION

Figure 1:
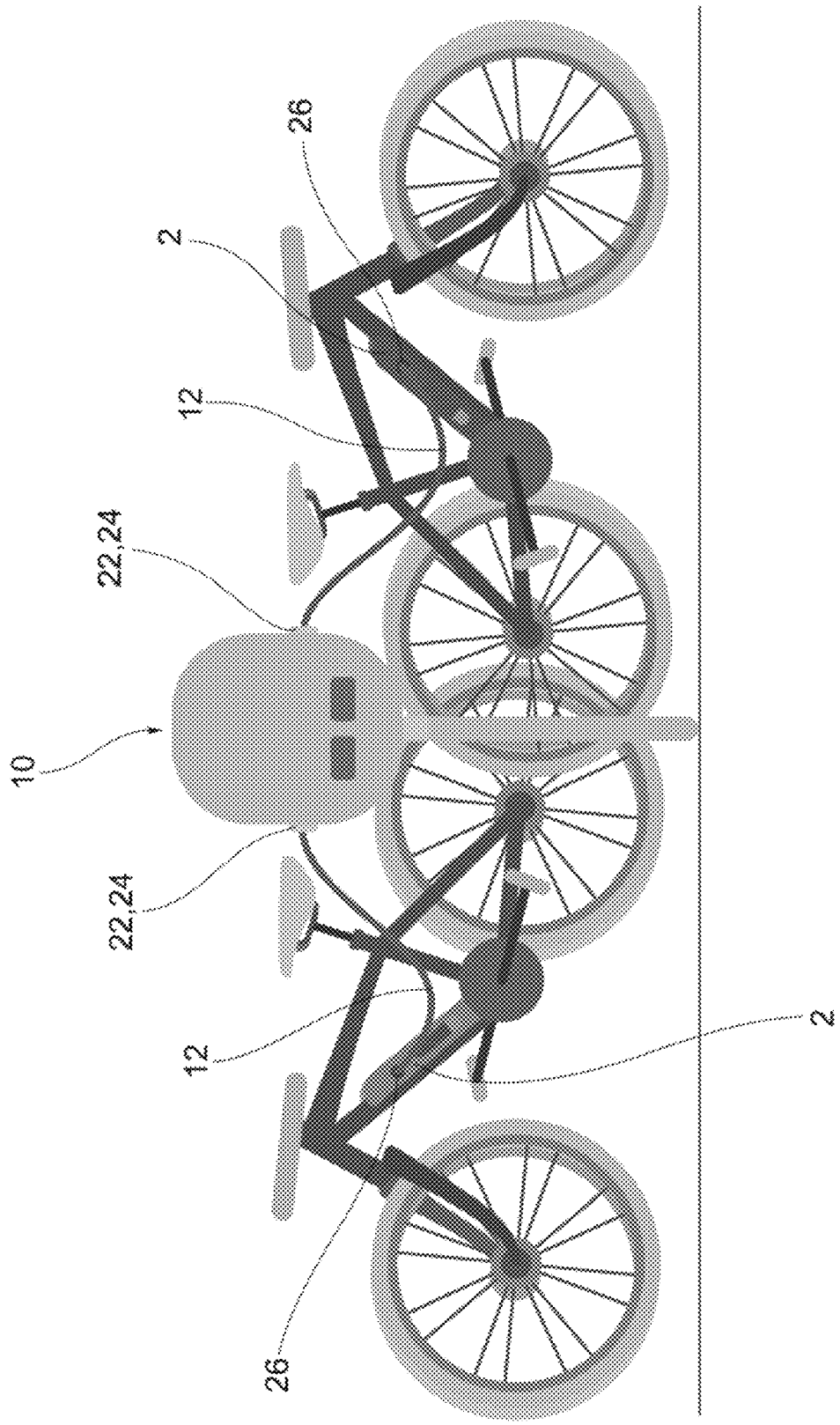
FIG. 1 shows a charging system according to the present invention.

In the drawings, a charging system of batteries of electric vehicles according to the present invention is indicated with reference numeral 1 as a whole.

The charging system 1 comprises a charging station 10 and at least one charging cable 12, connectable to a battery 2 to be charged, e.g. the battery or accumulator of an electric or pedal-assisted bicycle.

The charging station 10 may be a public station installed near roads, parking lots, and public buildings.

The charging cable 12 connects the charging station 10 to the battery to be charged.

The charging system 1 comprises a power supply unit 14 adapted to generate at least one battery supply voltage. The battery supply voltage generated by the power supply unit 14 is adapted to charge the battery 2 at the expected working voltage.

The charging system 1 further comprises a service power unit 16 adapted to generate a service voltage. The service voltage is not used to supply the battery but electronic devices of the charging station 10, as better describe thereinafter. The service power unit 16 may be separated from the power supply unit 14 or may be inside the power supply unit 14.

The charging station 10 is managed by a control unit 18 which is operatively connected to the power supply unit 14 and the service supply unit 16. For example, the control unit 18 is supplied by the operating voltage.

The charging station 10 further comprises a regulator 20 connected to the control unit 18 and adapted to supply a regulated charging current to the battery 2 to be recharged.

The charging station 10 comprises at least one female-type multipole charging connector 22, for example, an electric socket, for connecting to the charging cable 12.

The female-type multipole charging connector 22 comprises:
- a negative terminal A and a positive terminal B, both connected to the regulator 20;
- a logic input C operatively connected to the control unit 18; and
- a digital logic output D operatively connected to the control unit 18.

The charging cable 12 comprises a first male-type multipole cable connector 24 adapted to be connected to the female-type multipole charging connector 22, and, at the opposite end of the cable, a second multipole cable connector 26 connectable to the battery 2.

The second multipole cable connector 26 is configured to connect to the connector on the battery 2 to be charged.

The first male-type multipole cable connector 24 comprises:
- a negative terminal A' and a positive terminal B' connectable to the negative and positive poles of the battery 2 (by means of the second multipole cable connector 26) and to the negative A and positive B terminals of the female-type multipole charging connector 22 (by means of the first male-type multipole cable connector 24);
- a connected connector check terminal C', connected to the negative terminal A' of the first male-type multipole cable connector 24 and connectable to the logic input C of the female-type multipole charging connector 22;
- a battery enabling terminal D' adapted to be connected to the digital logic output D of the female-type multipole charging connector 22.

Figure 2A:
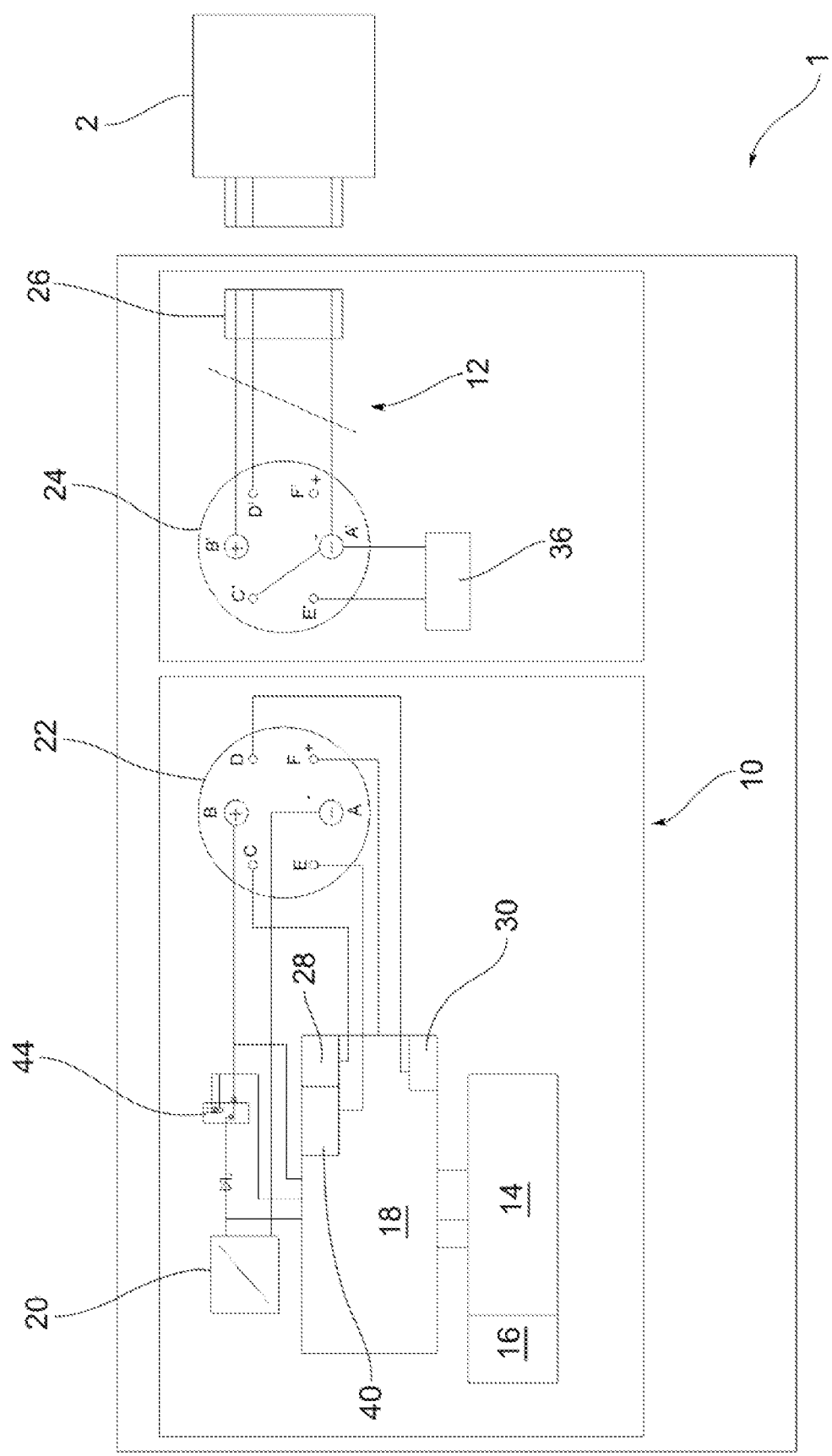
FIG. 2 is a wiring diagram of the charging system.
Figure 2B:
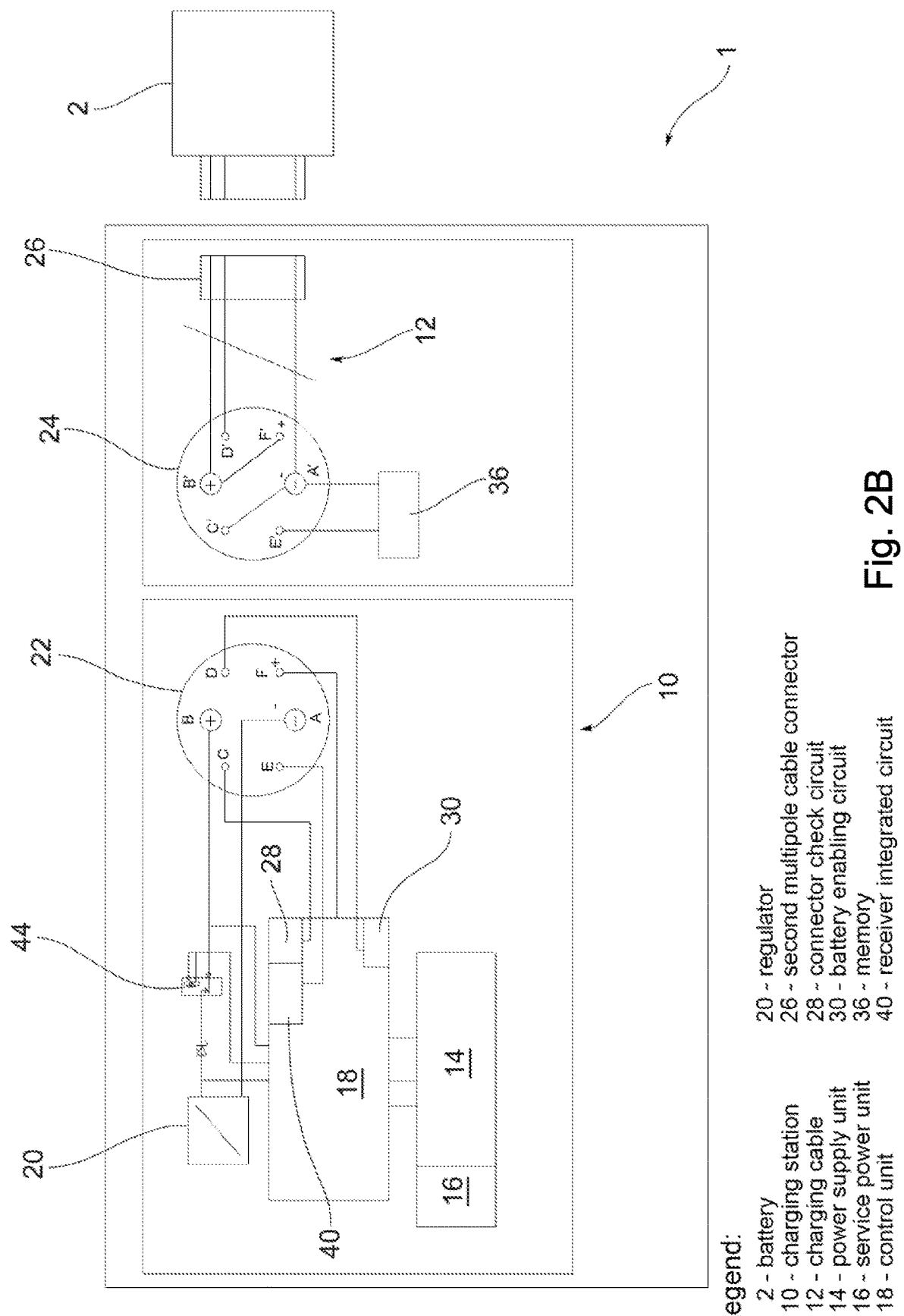

The second multipole cable connector 26 has a number of poles depending on the type of battery 2 to be charged. For batteries of the first type, that can be charged as soon as current is supplied to the terminals of the charging cable, the second multipole cable connector 26 has only two poles (positive and negative). For the second type of battery, which requires to be queried by a control signal to connect the battery poles to the charging cable, in addition to the positive and negative poles a third pole for the control signal is provided, as shown in the example of FIG. 2.

The control unit 18 comprises a connected connector check circuit 28, operatively connected to the logic input C of the female-type multipole charging connector 22 and adapted to detect whether the logic input C is at the voltage present on the negative pole of the battery 2. In the affirmative case, the charging cable 12 is correctly connected both to the battery 2 to be charged and to the charging connector 22.

The control unit 18 further comprises a battery enabling circuit 30 adapted to provide an enabling signal to the digital logic output D adapted to allow connection of one of the battery poles, e.g. the positive pole, to the corresponding terminal of the charging cable, e.g. the positive terminal B'.

In an embodiment, the control unit 18 has a further voltage presence input I connected to the positive terminal B of the female-type multipole charging connector 22. Usually, the voltage presence input is at a zero logic value. If a battery of the second type is connected, in reply to reception of the enabling signal, the battery 2 enables transmission of its own voltage level on the positive pole B' of the first male-type multipole cable connector 24, and thus on the voltage presence input I. In the case of a battery of the first type, on the other hand, the internal protections with which it is provided do not allow the charging cable to read the voltage at the ends of the battery and the voltage presence input I remains at zero logic value.

In an embodiment, the charging system 1 comprises a switch device 44, e.g. a relay, between the regulator 20 and the female-type multipole charging connector 22. The switch device is controlled by the control unit 18 to switch between an open position, in which it inhibits passage of the charging electric current from the regulator 20 to the female-type multipole charging connector 22, and a closed position, in which it allows passage of the charging electric current from the regulator 20 to the female-type multipole charging connector 22.

In this embodiment, the voltage presence input I, if provided, is connected to the positive terminal B, downstream of the switch device 44.

The control unit 18 is programmed to implement the following battery charging procedure.

The correct connection of the battery charging cable is first checked by detecting, by the connected connector check circuit 28, whether the logic input C is at the voltage present on the negative battery pole 2.

In the affirmative case, the control unit 18 commands the battery enabling circuit 30 to supply the enabling signal to the digital logic output D.

The control unit 18 remains in a waiting for enabling state for a predetermined time, after which the control unit 18 controls delivery of charging current.

The predetermined time interval is chosen so that the batteries of the second type can receive and recognize the enabling signal and reply by connecting the battery poles to the charging cable. The predetermined time interval is chosen on the basis of the longest response time among commercially available batteries of the second type.

In accordance with an embodiment, either before or during the waiting for enabling state, the control unit 18 performs a step of self-diagnosing, in which it runs internal tests on the charging station to check that the electrical charging parameters correspond to the expected values, to prevent malfunctioning of the charging station from affecting the connected battery.

For example, the control unit detects the value of the voltage output to the regulator 20 by means of a regulated voltage input H.

During the self-diagnosing step, the switch device 44, if present, is left in the open position to protect the connected battery and is closed by the control unit 18 only if no malfunctions are detected during the self-diagnosing step.

In an embodiment, at the end of the step of waiting for enabling, the control unit 18 checks whether a voltage corresponding to the positive pole of the battery is present on the voltage presence input I. In the affirmative case, the connected battery 2 is of the second type.

Once the connected connector check circuit 28 has detected a correct connection and the predetermined time interval of the step of waiting for enabling has elapsed, the control unit 18 establishes which of the two types of battery is connected, between the first type with direct access and the second type with access conditioned by the battery enabling signal.

In an embodiment, the control unit 18 is programmed to charge the battery 2 with two different charging algorithms according to the connected battery type.

In an embodiment, the power supply unit 14 is adapted to generate at least two different battery supply voltages, e.g. a first voltage adapted to charge a 36 V battery and a second voltage adapted to charge a 48 V battery.

The charging system 1, in this case, comprises at least two charging cables 12, a first cable for charging a battery with a first working voltage and a second cable for charging a battery with a second working voltage.

Advantageously, the two charging cables 12 are the same in terms of number and function of the terminals.

In particular, the female-type multipole charging connector 22 and the first male-type multipole cable connector 24 have an additional voltage identification terminal F, F', respectively. The voltage identification terminal of the multipole charging connector F is connected to the control unit 18.

The two cables can be identified in that only the voltage identification terminal F' is connected to either the positive terminal B' or the negative terminal A' in one of the two charging cables 12. In this manner, the control unit 18 can detect a different voltage on the voltage identification terminal F according to whether said voltage identification terminal F is either connected to or disconnected from the positive or negative terminal of the first male-type multipole cable connector 24. Having identified the cable type and, consequently, the working voltage of the connected battery, the control unit supplies the corresponding battery supply voltage to the regulator 20.

The control unit 18 is configured to deliver the lowest supply voltage. Indeed, most batteries currently operate at 36 V. When the control unit 18 detects the presence of a charging cable 12 for a battery with a higher working voltage, e.g. 48 V, the control unit 18 activates a voltage multiplying circuit to provide the appropriate voltage to the regulator 20.

In an embodiment, the first male-type multipole cable connector 24 is provided with an authentication integrated circuit comprising a memory 36 containing information about the source of the charging cable 12 and connected to an additional communication terminal E' of the first male-type multipole cable connector 24.

The female-type multipole charging connector 22 has a corresponding communication terminal E connected to control unit 18. The corresponding communication terminal E is provided with a receiver integrated circuit 40 adapted to receive data from the authentication integrated circuit by communication terminals E, E'.

The receiver circuit 40 may send a query signal to the authentication integrated circuit.

Therefore, the authentication integrated circuit and the receiver integrated circuit form a pair of circuits capable of exchanging data for authenticating the charging cable.

If the control unit 18 does not receive predetermined authentication information from the cable, it will not enable the delivery of the power voltage so as not to risk damaging the battery.

Figure 3:
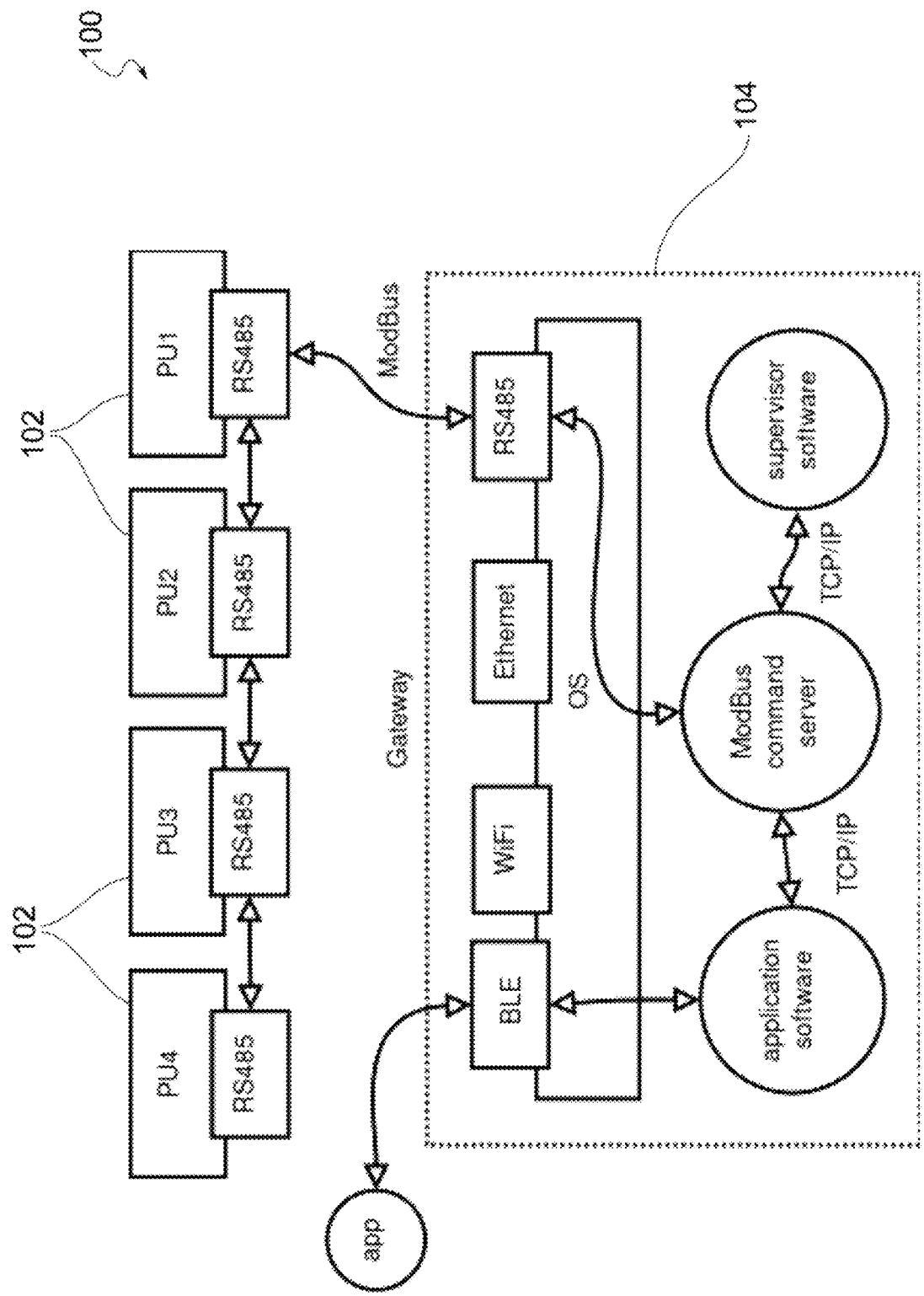
FIG. 3 is a block chart of the hardware and software components of a charging station.

FIG. 3 is a block chart that shows the hardware and software components of a charging station 10 in an embodiment.

The charging station 10 comprises one or more power units 102 and a gateway node 104 which allows control and communication with the outside world.

Each power unit 102 comprises a power card for charging a battery. For example, there are four power units 102 in the charging station 10, interconnected in daisy-chains on an RS485 serial line and connected to the gateway node 104.

In an embodiment, the gateway node 104 is made with an embedded microprocessor system on which the main software applications, which allow the delivery of configuration and control services are run. The gateway node 104 thus implements the control unit of the charging station.

The gateway node 104 allows the connection of the charging station to an existing telecommunications network.

For example, the following communication technologies are supported on the gateway node 104:
IEEE 802.11 (Wi-Fi) in Station mode
IEEE 802.11 (Wi-Fi) in Access Point (AP) mode
IEEE 802.15.4 (Bluetooth)
IEEE 802.3 (Ethernet)

All the connectivity methods listed above are independent and can operate simultaneously on separate networks.

In an embodiment, the power units 102 are controlled by the gateway node 104. For example, the communication with the power units 102 is performed by ModBus© commands which allows sending execution requests. The applications on the gateway can interact with the power units 102 by means of a layer between the application layer and the operating system consisting of a command server (ModBus command server). The application accepts local TCP/IP requests and sends them to the power units while maintaining consistency and atomicity of ModBus transactions.

In an embodiment, the application-level software is mainly divided into two parts: user management software and control software.

As described in greater detail hereinafter, the management software (application software) has the task of interacting with user applications during service delivery. The software allows identifying a user connected via app on the BLE interface of the gateway node. Furthermore, the software application authorizes the delivery and controls eligibility to use the service.

The control software (software supervisor) has the task of controlling the entire system during the operation and of reporting any critical issues.

Examples of charging cable authentication by the charging station 10 will now be described.

At the end of the physical assembly operations of the cable, each cable is equipped with a specific authentication integrated circuit 36 for its unique identification during service.

The authentication circuit has a read-only memory area that contains a unique cable identifier code (ROMID) which identifies each authentication circuit 36 and is inserted by the cable manufacturer.

The memory area may be made using DeepCover® technology and prevents tampering of information contained within the chip.

The cable is therefore recorded in the manufacturing environment.

Furthermore, a unique cable identification token (CTID) is associated with each identifier code generated by the manufacturing system and used as a cable identifier during the steps of activating the charging cable, as described below.

In an embodiment, the unique token is implemented by a QR-Code, applied on the package of the cable purchased by the user. With the QR-Code, the user can access the online cable activation services.

The cable authentication circuit 36, in addition to the passive identification function, also performs an active hardware authentication function with the charging station 10, through an authentication algorithm.

In an embodiment, the authentication algorithm is implemented with a symmetric (or pre-shared) key challenge-response authentication mechanism, SCRAM.

This mutual authentication mechanism allows the charging station to determine the authenticity of the connected cable on the hardware level. In order to authenticate the cable, each charging station is also equipped, within each power unit 102, with its own authentication circuit (e.g. the above-described receiver integrated circuit 40).

The authentication mechanism provides the generation of a MAC using the SHA256 hash function. In order to be authenticated, both parties must share the same encryption key used when composing the input for the function. The pre-shared key is the secret key used to ensure non-repudiation of the parties. The pre-shared key must be programmed in the memory area of both the authentication circuits in the cables and the charging station.

Authentication is symmetric and occurs in both directions. The charging station generates a 32-bit long random challenge by a true random number generator (TRNG) inserted inside the charging station and then sends the challenge to the cable. The authentication integrated circuit inside the cable calculates the digest of the challenge and of the pre-shared key programmed inside and returns the result to the authentication circuit of the charging station. At the same time, the authentication circuit of the charging station calculates the digest of the same challenge using the internally programmed pre-shared key. If the received digest and the generated digest are the same, then the cable is authenticated by the charging station; vice versa the authentication fails.

The programming of the cables provides writing of the pre-shared key in both authentication circuits.

The procedure for identifying the charging cables will now be described.

As mentioned above, the charging cables are provided with hardware specialized to ensure their unique identification. Each cable is unique and may be combined with the user of the service.

The unique identification of the cable ensures non-clonability and non-reproducibility of the cables. In other words, the unique identification of the cable allows limiting, if not preventing, copying (cloning) of a cable, with the result of having two identical cables with the same ROMID, and the possibility for a competitor to make and offer cables compatible with the described system. This reduces the risk of spreading of counterfeit cables which may be dangerous if they do not comply with safety regulations and damage both the charging station and the battery.

Furthermore, the coding of the cables in order to identify them individually also allows autonomous collection of information during their use. Indeed, when a cable is connected to a charging station, the internal hardware of the station can check the authenticity of the cable to identify it.

Figure 4:
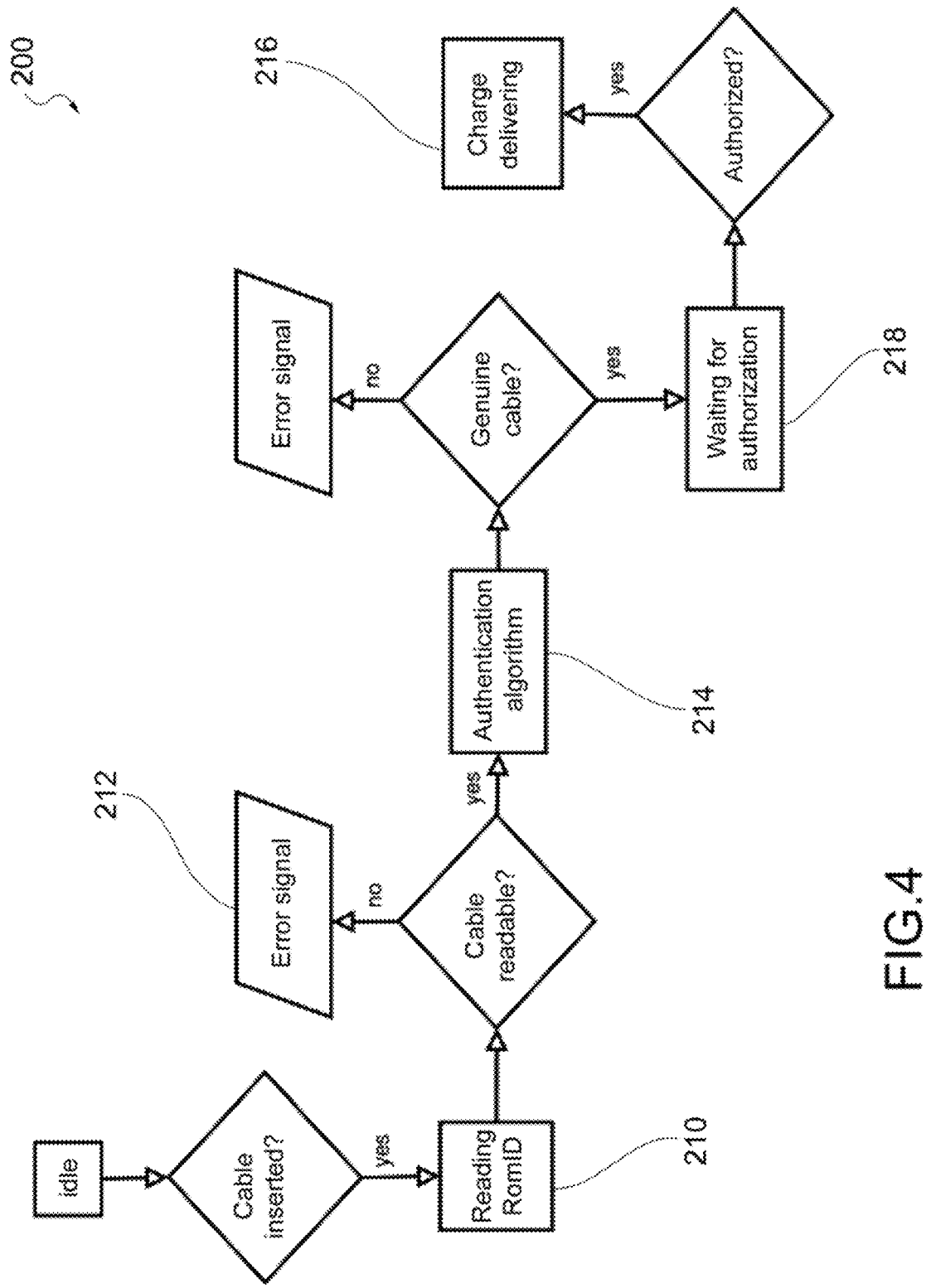
FIG. 4 is a flow chart of an authentication algorithm of a charging cable.

FIG. 4 is a block chart of the authentication algorithm 200 of a cable.

Such an algorithm occurs in two steps: authentication and identification.

In a first step of identifying, when the cable is inserted into the connector of the charging station, the identifier code inside the cable (ROMID) is read by the charging station (step 210). If the cable can be read, the algorithm continues with the step of authenticating; otherwise, an error signal is generated (step 212).

The authenticity of the cable is checked during the second step of authenticating the inserted cable, (step 214), using an authentication algorithm, e.g. the symmetric key algorithm described above.

If the cable is genuine, then the charging station software proceeds by delivering the charge (step 216), possibly after waiting for authorization (step 218), for example, from a service payment system.

A user identification process will now be described.

In some embodiments, in addition to the authentication mechanism of the cable, there may be an additional mechanism for identifying the user of the delivery service, by an application that can be installed on smartphones.

The method comprises the following steps:
1. Buying a cable from the cable manufacturer;
2. Registering the user on the cable manufacturer's website;
3. Activating the purchased cable; and
4. Installing the application.

The registration of the user allows collecting the user's personal and identification data, for example, email address and generation of a password to access services that allow the unique identification of the user. Other personal data of the user concerning other aspects of the service may be collected during this step.

Once registered, each user is assigned a unique user identifier code (UID), which allows each user to be identified. Indeed, the activation of the cable requires the user to be logged into the online service of the cable manufacturer and the activation can be made only by the user in possession of the QR-Code associated with the package of the cable purchased or printed on the cable.

This step allows establishing a two-way relationship between the unique token (CTID) and the unique user identifier code (UID).

It is worth noting that a user may own and activate more than one cable; in this case, there will be a list of cables activated and owned by a single user.

Figure 5:
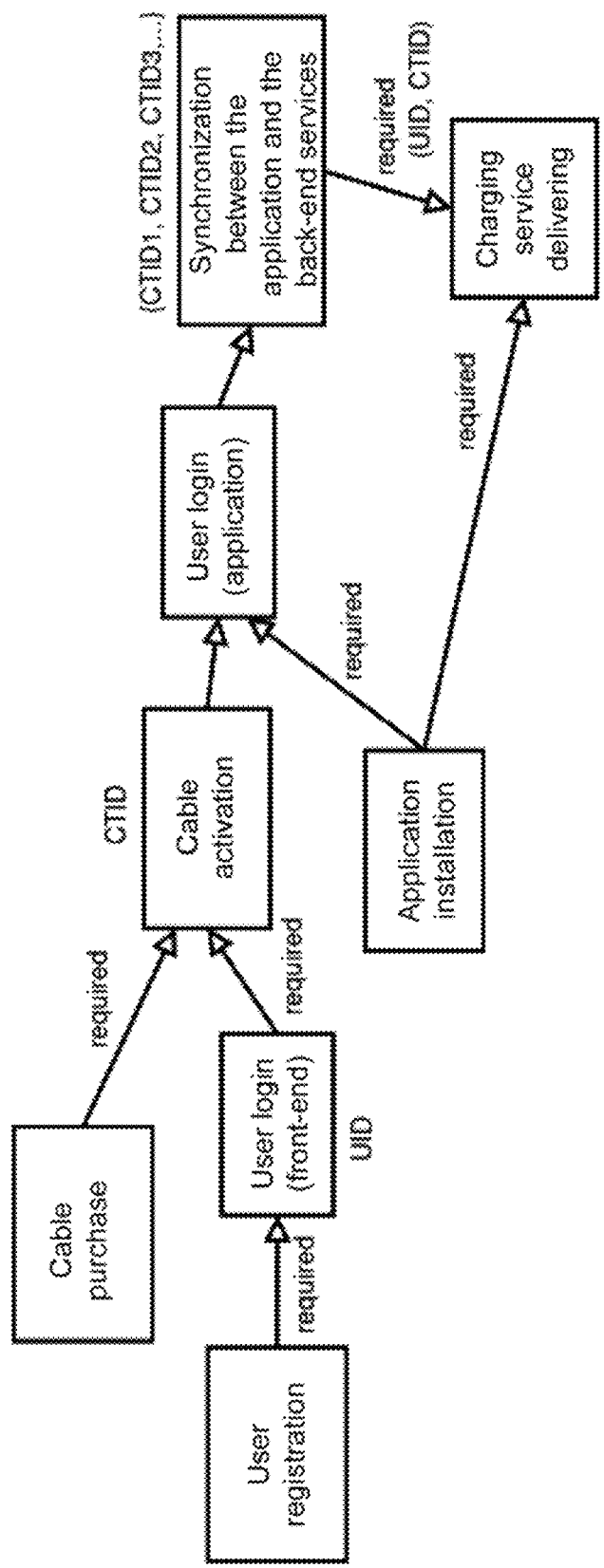
FIG. 5 is a flow chart of a user identification algorithm.

In an embodiment, the charging service is delivered after the user has been identified. FIG. 5 shows an outline of the actions required to identify the user.

The functional requirement of the user login of the installed application and synchronization between the application and the back-end services of the cable manufacturer are highlighted. This step is necessary to keep a local copy of the user's activated cable list synchronized. The copy is made in one direction only using the information contained in the cable manufacturer's back-end as the master and the temporary copy kept on the application installed on the smartphone as the slave.

Therefore, Any change to a user's active cable list must be made by the cable manufacturer's front-end services and regular synchronization of this information by the application installed on the smartphone is necessary for this to take effect.

It is worth noting that there are no particular constraints on the number of installed applications. Therefore, it is assumed that a user will not install the application and log in on not personally owned devices.

In an embodiment, the interaction of the charging station with the application installed on the smartphone takes place via a communication protocol based on Bluetooth® technology. The application sends the tuple (UID, {CTID1, CTID2, CTID3, . . . }) consisting of the unique identifier of the concerned user (UID) and the list of cables activated by the user {CTID1, CTID2, CTID3, . . . } to the charging station.

It is worth noting that this mechanism takes place in a competitive manner by not imposing limits on the number of users requesting the delivery. In this case, there will be multiple tuples containing lists of cables for different users (UID1, {CTID1, CTID2, CTID3, . . . }) (UID2, {CTID4, CTID5, CTID6, . . . }) (UID3, {CTID7, CTID8, CTID9, . . . }), etc.

The charging station, therefore, is informed of potential cables which can be connected to the connector of a power unit. This information may be limited in time.

When the cable is actually connected to a charging station, the step of identifying the cable described above allows identifying the inserted cable uniquely and to retrieve the unique token (CTID) associated with the identifier code contained in the cable.

By comparing the unique token of the connected cable with tokens contained in the lists of expected cables {CTID1, CTID2, CTID3, . . . }, {CTID4, CTID5, CTID 6, . . . }, {CTID7, CTID8, CTID9, . . . }, it is possible to uniquely identify the user (UID) requesting the delivery, and proceed with supplying the service.

In an embodiment, with reference to the cable above-described authentication procedure, illustrated in the block chart in FIG. 4, the step of identifying the user is performed by the charging station either before or after the authentication algorithm is run. For example, if the outcome of the cable authentication algorithm is positive, the algorithm waits for the user identification procedure to be successfully completed during the step of waiting for authorization 218.

It is worth noting that since the cable is paired with only one user, it is possible to decide to lock the cable to prevent its use.

This function can be useful in case of theft or loss of the cable. By connecting to the cable manufacturer's front-end services and logging in, the user may report the lost or stolen cable and block it.

A blocked cable can no longer be used for delivering the service.

A person skilled in the art may make changes and adaptations to the embodiments of the charging system of the present invention or replace elements with others which are functionally equivalent to satisfy contingent needs without thereby departing from the scope of protection as described and claimed herein. All the features described above as belonging to one possible embodiment may be implemented independently from the other embodiments described.

What is claimed is:

1. A charging system of an electric vehicle battery, comprising a charging station and at least one charging cable connectable to a battery to be recharged, wherein the charging station comprises at least one power unit having a power supply suitable for charging the battery, and a female-type multipole charging connector suitable for connecting to a first male-type multipole cable connector of the at least one charging cable, wherein the at least one charging cable and the charging station comprise respective authentication circuits configured for implementing a cable authentication algorithm which, if successful, enables battery charging, wherein:

the at least one power unit having the power supply is adapted to generate at least two different battery supply voltages, the charging system comprises at least two charging cables, the female-type multipole charging connector and the first male-type multipole cable connector respectively comprise a voltage identification terminal, the voltage identification terminal of the female-type multipole charging connector being connected to a control unit, in one of the two charging cables, the voltage identification terminal of the first male-type multipole cable connector is connected to one of a positive terminal or a negative terminal so that the control unit detects a different voltage on the voltage identification terminal of the female-type multipole charging connector according to whether said voltage identification terminal of the female-type multipole charging connector is connected to or disconnected from the positive terminal or the negative terminal of the first male-type multipole cable connector, and supplies a respective battery supply voltage to a regulator.

2. The charging system of claim 1, wherein the cable authentication algorithm is implemented with a symmetric key challenge-response authentication mechanism (SCRAM), the authentication circuits of the at least one charging cable and of the charging station sharing a same encryption key.

3. The charging system of claim 1, wherein an unmodifiable unique identification code (ROMID) is stored in the authentication circuit of the at least one charging cable, and wherein the authentication circuit of the charging station is configured for reading said unmodifiable unique identification code.

4. The charging system of claim 1, further comprising:
a service supply unit adapted to generate a service voltage;
the control unit being connected to a power supply unit and to the service supply unit, the control unit being supplied by the service voltage; and
the regulator being connected to the control unit and adapted to supply regulated charging current to the battery to be recharged;
wherein the female-type multipole charging connector comprises:
a positive terminal and a negative terminal, connected to the regulator;
a logic input operatively connected to the control unit; and
a digital logic output operatively connected to the control unit;
and wherein the at least one charging cable comprises, at one end, the first male-type multipole cable connector and, at an opposite end, a second multipole cable connector connectable to the battery, said first male-type multipole cable connector comprising:
the positive terminal and the negative terminal connectable to positive and negative battery poles of the second multipole cable connector and to the positive and negative terminals of the female-type multipole charging connector;
a connected connector check terminal, connected to the negative terminal of the first male-type multipole cable and connectable to the logic input of the female-type multipole charging connector; and
a battery enabling terminal adapted to be connected to the digital logic output of the female-type multipole charging connector,
the control unit comprising:
a connected connector check circuit, operatively connected to the logic input of the female-type multipole charging connector and adapted to detect whether the logic input is at a voltage present on the negative battery pole;
a battery enabling circuit adapted to supply an enabling signal to the digital logic output to allow connecting the positive battery pole to the positive terminal of the first male-type multipole cable connector;
the control unit being programmed to implement a charging process which comprises:
detecting, by the connected connector check circuit, whether the logic input is at the voltage present on the negative battery pole;
in the affirmative case, commanding the battery enabling circuit to supply the enabling signal to the digital logic output;
remaining in a waiting for enabling state for a predetermined time interval, calculated on the basis of response time of the battery to the enabling signal; and
at the end of said predetermined time interval, commanding delivery of the charging current.

5. The charging system of claim 4, wherein the control unit further has a voltage presence input connected to the positive terminal of the female-type multipole charging connector and is programmed to check, at the end of the waiting for enabling state for the predetermined time interval, whether voltage corresponding to the voltage present on the positive battery pole is present on said voltage presence input.

6. The charging system of claim 5, wherein the control unit is programmed to charge the battery with two different charging algorithms according to a voltage value present on the voltage presence input.

7. The charging system of claim 1, wherein the first male-type multipole cable connector comprises an authentication integrated circuit comprising a memory unit containing information on a source of the cable and connected to a further communication terminal of the male-type multipole cable connector, the female-type multipole charging connector comprising a corresponding communication terminal connected to the control unit, the control unit comprising a receiver integrated circuit adapted to receive data from the authentication integrated circuit.

8. The charging system of claim 1, wherein the charging station comprises a switch device between the regulator and the female-type multipole charging connector, the switch device being controlled by the control unit to switch between an open position, in which the switch inhibits passage of a charging current from the regulator to the female-type multipole charging connector, and a closed position, in which the switch allows passage of the charging current from the regulator to the female-type multipole charging connector.

9. A method for charging an electric vehicle battery, the method comprising:
providing a charging system comprising a charging station and at least one charging cable connectable to a battery to be recharged, wherein the charging station comprises at least one power unit having a power supply suitable for charging the battery, and a female-type multipole charging connector suitable for connecting to a first male-type multipole cable connector of the at least one charging cable, wherein the at least one charging cable and the charging station comprise respective authentication circuits configured for implementing a cable authentication algorithm which, if successful, enables battery charging, wherein the charging of the electric vehicle battery is subject to a verification of a user authorization to use a charging service, said verification of the user authorization to use the charging service being carried out by a user identification procedure, the user identification procedure comprising, for each cable of the at least one charging cable:
associating, during a cable production step, a unique cable identification code (ROMID), said unique cable identification code being readable by the charging station when the cable is connected to the charging station;
associating to said unique cable identification code a unique cable identification token (CTID) and a unique user identification code (UID);
transmitting, by the user, said unique cable identification token (CTID) and said unique user identification code (UID) to the charging station;
connecting the cable to the charging station;
obtaining, from the charging station, the unique cable identification token (CTID) from reading the unique cable identification code (ROMID) stored in the connected cable; and
comparing, by the charging station, the unique cable identification token (CTID) obtained with the unique identification code transmitted by the cable with the unique cable identification token (CTID) transmitted by the user; and checking whether the at least one charging cable is authentic by an authentication procedure performed by the cable authentication circuits on board the at least one charging cable and the charging station when the cable is connected to the charging station.

10. The method of claim 9, wherein the unique cable identification token (CTID) and the unique user identification code (UID) are transmitted by the user to the charging station wirelessly through an app residing on a portable electronic device of the user.

* * * * *